(12) United States Patent
Deshpande et al.

(10) Patent No.: US 10,389,143 B2
(45) Date of Patent: Aug. 20, 2019

(54) BATTERY POWER PREDICTION FOR HIGH LOAD EVENTS

(71) Applicant: FORD GLOBAL TECHNOLOGIES, LLC, Dearborn, MI (US)

(72) Inventors: Rutooj Deshpande, Farmington Hills, MI (US); Satish Chikkannanavar, Canton, MI (US); Bhaskara Boddakayala, Troy, MI (US); Kevin Vander Laan, Bloomfield Hills, MI (US); Xu Wang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/836,385

(22) Filed: Dec. 8, 2017

(65) Prior Publication Data

US 2019/0181657 A1  Jun. 13, 2019

(51) Int. Cl.
| | | |
|---|---|---|
| *H02J 7/00* | (2006.01) |
| *B60L 11/14* | (2006.01) |
| *F02N 11/08* | (2006.01) |
| *B60L 11/18* | (2006.01) |
| *B60L 15/20* | (2006.01) |

(52) U.S. Cl.
CPC .............. *H02J 7/0021* (2013.01); *B60L 11/14* (2013.01); *B60L 11/1864* (2013.01); *B60L 15/20* (2013.01); *F02N 11/0862* (2013.01); *B60L 2260/26* (2013.01); *F02N 2200/061* (2013.01)

(58) Field of Classification Search
CPC .. B60L 15/20; B60L 11/1864; B60L 11/1851; B60L 11/1861; B60L 2260/26; F02N 11/0862
See application file for complete search history.

(56) References Cited

U.S. PATENT DOCUMENTS

| | | | | |
|---|---|---|---|---|
| 5,664,635 | A * | 9/1997 | Koga ..................... | B60K 6/46 180/65.245 |
| 7,583,053 | B2 | 9/2009 | Kamohara | |
| 9,225,198 | B2 * | 12/2015 | Ishida ..................... | H02J 3/14 |
| 9,409,485 | B2 | 8/2016 | Lee et al. | |
| 2004/0076872 | A1 * | 4/2004 | Kinoshita ............ | B60L 11/1861 429/61 |
| 2010/0185405 | A1 * | 7/2010 | Aoshima ............... | B60L 3/0046 702/63 |
| 2012/0109443 | A1 * | 5/2012 | Takahashi ............... | B60L 1/003 701/22 |
| 2014/0210262 | A1 * | 7/2014 | Yaegaki .................. | B60K 6/48 307/10.1 |
| 2015/0207410 | A1 * | 7/2015 | Ono .................... | B60L 11/1851 307/10.1 |

FOREIGN PATENT DOCUMENTS

DE     102012007989     10/2013

* cited by examiner

*Primary Examiner* — Brian L Swenson
(74) *Attorney, Agent, or Firm* — David Kelley; Brooks Kushman P.C.

(57) ABSTRACT

A system for a vehicle includes an engine and electric machine each configured to propel the vehicle, and a controller configured to, responsive to a resistance of a traction battery and a change in the resistance during battery discharge being greater than respective thresholds, reduce power to the electric machine and activate the engine.

15 Claims, 9 Drawing Sheets

BATTERY POWER PREDICTION FOR HIGH LOAD EVENTS

TECHNICAL FIELD

The present disclosure relates to systems and methods for analyzing an available amount of power of a traction battery during a predefined period of sustained discharge.

BACKGROUND

The term "electric vehicle" can be used to describe vehicles having at least one electric motor for vehicle propulsion, such as battery electric vehicles (BEV), hybrid electric vehicles (HEV), and plug-in hybrid electric vehicles (PHEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A system for a vehicle includes an engine and electric machine each configured to propel the vehicle, and a controller configured to, responsive to a resistance of a traction battery and a change in the resistance during battery discharge being greater than respective thresholds, reduce power to the electric machine and activate the engine.

A method for a vehicle includes, by a vehicle controller, reducing power to an electric machine from a traction battery and activating an engine responsive to resistance of the traction battery and change in the resistance during battery discharge being greater than respective thresholds, wherein each of the electric machine and engine is configured to propel the vehicle.

A system for a vehicle includes an engine and an electric machine each configured to propel the vehicle, and a controller configured to, responsive to a magnitude of battery discharge current being greater than a current threshold and a rate of reduction in battery discharge voltage being greater than a rate of change threshold, reduce battery power being provided to the electric machine and activate the engine.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

For charge depletion PHEV operation, during sustained discharge conditions, high currents or power demands may result in rapid increase, i.e., rate of change being greater than a threshold rate, in the apparent cell resistance and the cell voltage may drop to a voltage less than a predefined voltage. Under such conditions, the nonlinear increase in cell apparent resistance may cause cell discharge power capability to become reduced. The nonlinearity of such voltage response may cause difficulty in accurately estimating actual available battery power and reacting with sufficient swiftness if the change in voltage is greater than a predefined threshold. As one example, during a highway passing maneuver, a power demand may increase from moderate to high when the vehicle is already traveling at a high cruising speed. During such a scenario, available discharge power of the battery may decrease if the power demand causes a nonlinear voltage rate of change within the battery cells.

Figure 1A:
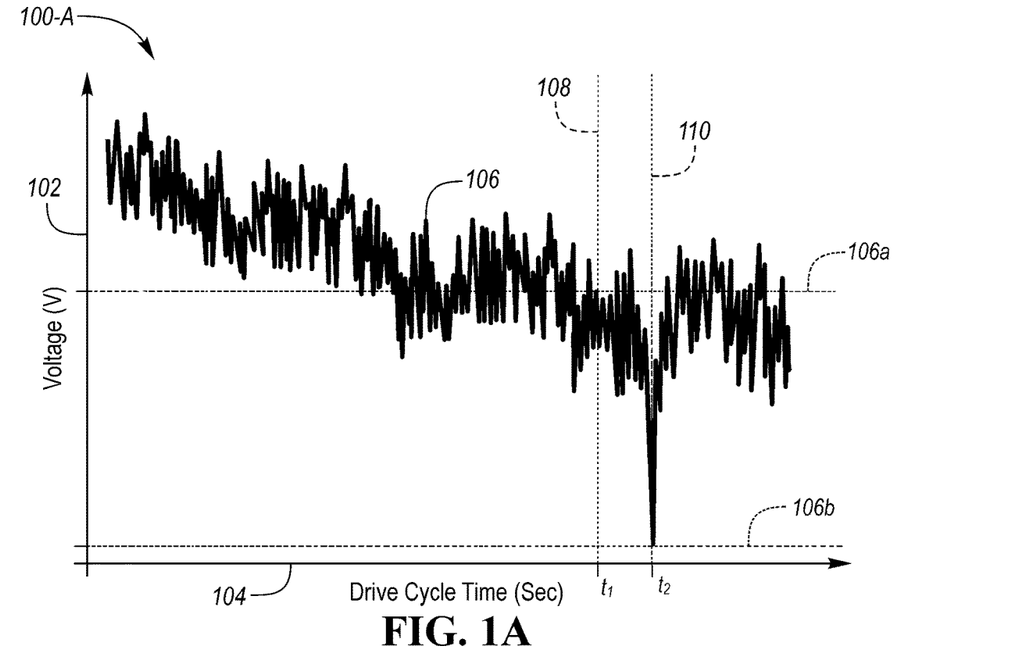
FIGS. 1A-1B are graphs illustrating a change in measured battery voltage.
Figure 1B:
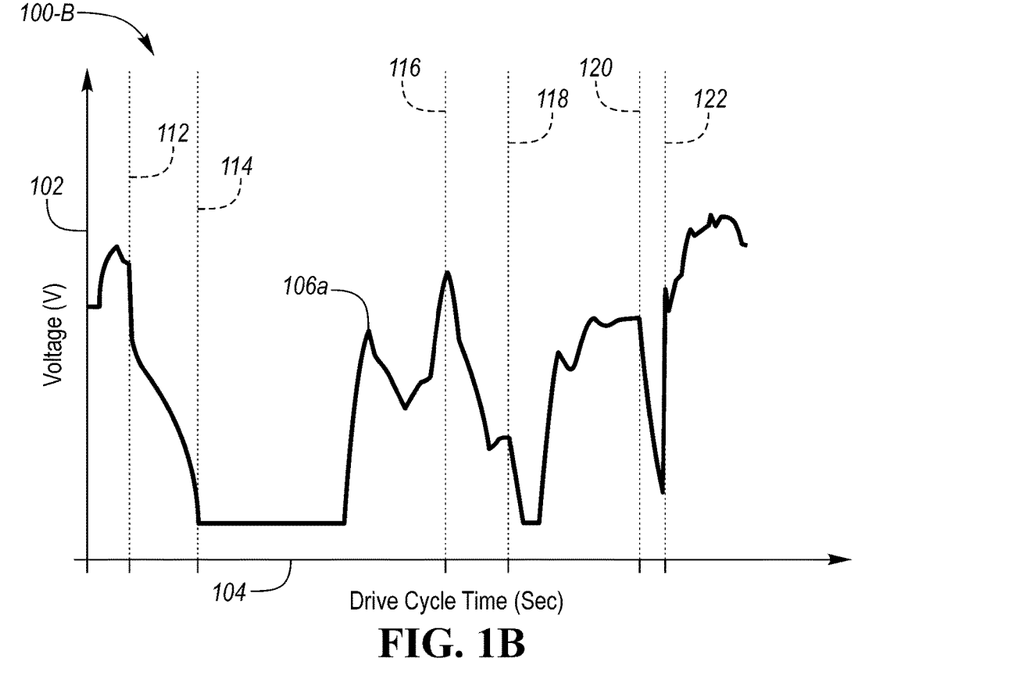
Figure 1C:
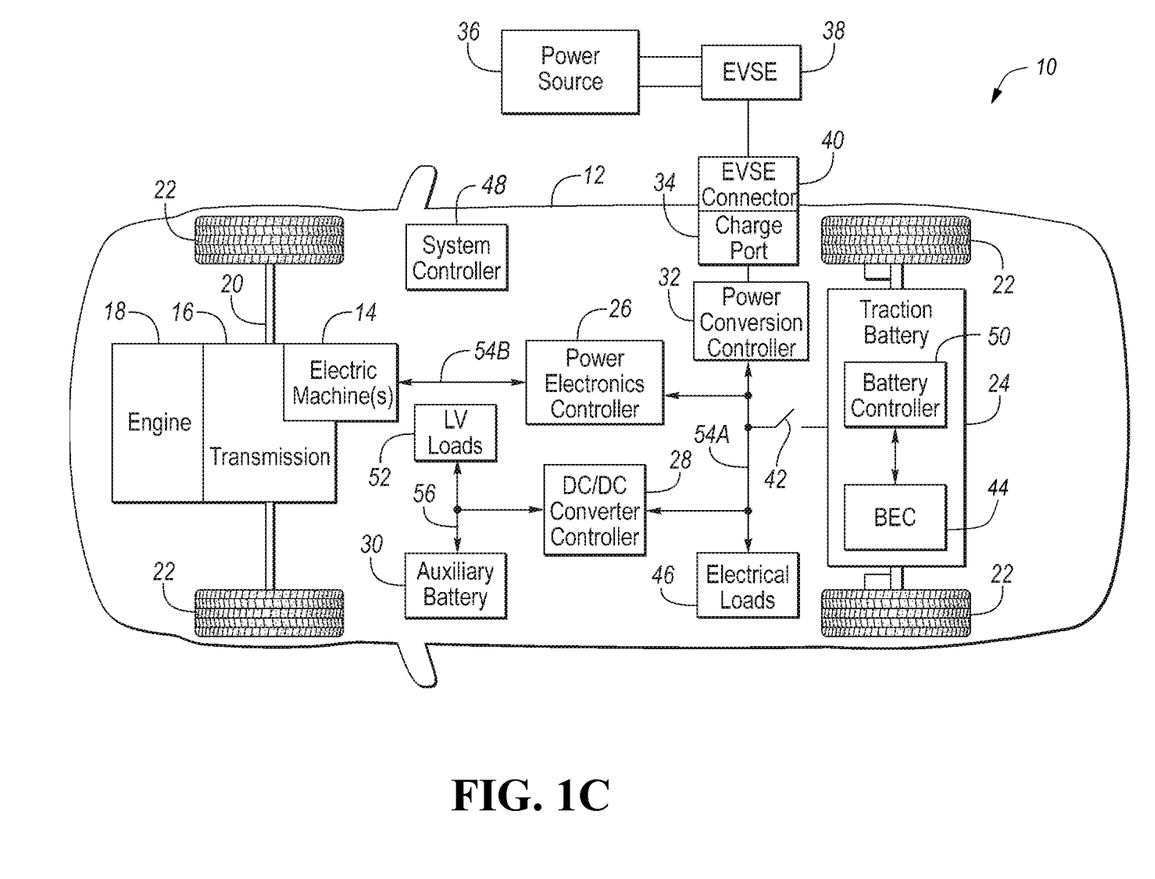
FIG. 1C is a block diagram illustrating an example plug-in hybrid electric vehicle.

As one example, FIG. 1C illustrates a vehicle system 10 for a plug-in hybrid-electric vehicle 12. The vehicle 12 may comprise one or more electric machines 14 mechanically coupled to a hybrid transmission 16. The electric machines 14 may be capable of operating as a motor or a generator. In addition, the hybrid transmission 16 may be mechanically coupled to an engine 18. The hybrid transmission 16 may also be mechanically coupled to an axle 20 mechanically coupled to the wheels 22. While FIG. 1C depicts a typical plug-in hybrid electric vehicle, the description herein is equally applicable to a pure electric vehicle or a hybrid electric vehicle of a different configuration, such as, but not limited to, a series hybrid. For a pure electric vehicle, e.g., battery electric vehicle (BEV), the hybrid transmission 16 may be a gear box connected to the electric machines 14 and the engine 18 may not be present.

The electric machines 14 can provide propulsion and deceleration capability either while the engine 18 is operated or turned off. The electric machines 14 may operate as generators and provide fuel economy benefits by recovering energy that would normally be lost as heat in a friction braking system. The electric machines 14 may additionally provide a reaction torque against the engine 18 output torque to generate electricity for recharging a traction battery 24 while the vehicle is operating. The electric machines 14 may further reduce vehicle emissions by allowing the engine 18 to operate near the most efficient speed and torque ranges. When the engine 18 is off, the vehicle 12 may be operated in electric-only mode, e.g., EV mode, using the electric machines 14 powered by the traction battery power as the sole source of propulsion.

The traction battery 24 stores energy that can be used by the electric machines 14. The traction battery 24 typically provides a high voltage and direct current (DC) output. In some instances, one or more contactors 42 may isolate the traction battery 24 from a DC high voltage bus 54A when opened and couple the traction battery 24 to the DC high voltage bus 54A when closed. While the contactor 42 is illustrated as a separate component, in some examples, the one or more contactors 42 may comprise a bussed electrical center (BEC) 44 configured to communicate with a battery controller 50 allowing the supply and withdrawal of electric energy to and from the traction battery 24. The battery controller 50 may issue a command to the BEC 44 to operate a plurality of switches, e.g., open or close contactors or relays, or otherwise manipulate one or more electrical components controlling transfer of energy to the traction battery 24, in response to one or more operating parameters associated with the traction battery 24 reaching a predefined threshold.

The traction battery 24 is electrically coupled to one or more power electronics controllers 26 via the DC high voltage bus 54A. The power electronics controller 26 is also electrically coupled to the electric machines 14 and provides the ability to bi-directionally transfer energy between alternating current (AC) high voltage bus 54B and the electric machines 14. For example, the traction battery 24 may provide a DC output while the electric machines 14 may operate using a three-phase AC to function. The power electronics controller 26 may convert the DC output of the traction battery 24 to a three-phase AC input that may be necessary to operate the electric machines 14. In a regenerative mode, the power electronics controller 26 may convert the three-phase AC output from the electric machines 14 acting as generators to the DC input compatible with the traction battery 24.

In some instances, during cold climate operations, with cell resistance trending higher (1-2 orders higher than at normal temperatures), the nonlinear decrease in cell discharge power capability may occur more frequently. This may occur, at least in part, due to diffusion limitations in the electrolyte and electrode phase inside a cell. Such occurrences may affect the PHEV vehicle performance, drivability and fuel economy. Early detection of a possible occurrence of nonlinear power capability reduction may improve the battery power capability prediction by providing additional time for control system to respond with a more gradual limiting of power. For example, beginning gradual reduction of predicted battery power capability, in response to detecting that voltage decrease rate is greater than a predefined rate threshold, may allow the control system to implement the change in predicted available power in a linear, rather than nonlinear, manner and may prevent activation of battery power limits at undesirable times.

The battery controller 50 may perform power prediction and forecasting for PHEVs during sustained drive events during charge depletion. The battery controller 50 may be connected to one or more sensors and may receive signals corresponding to voltage, current, resistance rate of change, and other parameters of one or more of a plurality of battery cells inside the traction battery 24, as described in reference to at least FIG. 1D. In some examples, a system controller 48 may be present to coordinate the operation of the various components, including those related to nonlinear power capability reduction. The system controller 48 and the battery controller 50, although each represented as a single controller, may be implemented as one or more controllers. The system controller 48 may, for example, monitor operating conditions of the traction battery 24, a power conversion controller 32, and the electric machine 14. The system controller 48 and/or the battery controller 50 may be configured to receive signals indicative of magnitude and direction of current flow through the traction battery 24, voltage level across terminals of the traction battery 24, and so on.

The battery controller 50 may enable detection of events related to a nonlinear decrease in voltage during sustained discharge operation. The battery controller 50 may determine a predicted available battery power that is less than the predicted available battery power determined using existing control algorithm, thereby preventing (or delaying or making gradual) activation of a battery power limit due an increased power demand. In concert with PCP/PLT power distribution strategies, the battery controller 50 may forecast the lesser predicted available battery power such that activation of power limiting for the vehicle 12 is more gradual and the EV mode operation may be maintained.

Figure 1D:
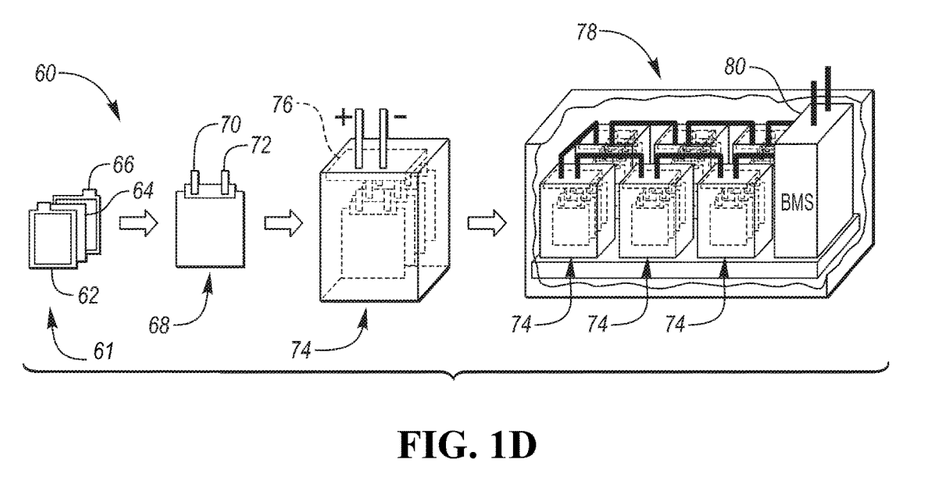
FIG. 1D is a block diagram illustrating an example battery cell configuration.

For example, FIG. 1D illustrates a block diagram of an example arrangement 60 for one or more portions the traction battery 24. The traction battery 24 may include a plurality of mono-cells 61, each having a cathode layer 62 and anode layer 66, also referred to as positive and negative electrodes, respectively, separated by a separator 64. The separator 64 enables current flow between the cathode and anode layers 62, 66 of the mono-cells 61. Each of the mono-cells 61 may further have a predefined nominal voltage.

The predefined number of mono-cells 61, e.g., 20, may be connected in series or in parallel with respect to one another to define a battery cell 68 including a positive terminal 70 and a negative terminal 72. The mono-cells 61 and the battery cells 68 may, for example, be electrochemical cells, capacitors, or other types of energy storage device implementations. The mono-cells 61 and the battery cells 68 may be arranged in any suitable configuration and configured to receive and store electric energy for use in operation of the vehicle 12. Each cell 68 may provide a same or different nominal threshold of voltage. While the traction battery 24 is described to include, for example, electrochemical battery cells, other types of energy storage device implementations, such as capacitors, are also contemplated.

The battery cells 68 may be further arranged into one or more arrays, sections, or modules further connected in series or in parallel. For example, a plurality of the battery cells 68 connected together in series may comprise a battery module 74. The battery module 74 may include a data connection 76 allowing one or more controllers of the vehicle 12, e.g., the BEC 44, to enable and disable energy flow to and from the battery module 74. Additionally or alternatively, the data connection 76 may include one or more cell sensors connected with one or more controllers of the vehicle 12, e.g., the battery controller 50. The cell sensors may, for example, include one or more of temperature sensors, voltage sensors, current sensors, and so on.

A predefined number of the battery modules 74 connected together in series or in parallel may define a battery pack 78. The battery pack 78 may include a battery management system (BMS) 80 configured to monitor and manage, such as via the data connection 76, one or more sub-components of the battery pack 78. In one example, the battery management system 80 may be configured to monitor temperature, voltage, and/or current of the mono-cells 61, the battery cells 68, the battery modules 74, and so on. The battery management system 80 may be in communication with one or more of the BEC 44 and the battery controller 50 and may enable energy flow to and from the battery pack 78 in response to a signal or a command from the BEC 44 and/or the battery controller 50. The traction battery 24 may, in one example, define one or more components similar to those described in reference FIG. 1D. Furthermore, the traction battery 24 defining additional and/or different components not specifically described in reference to FIG. 1D is also contemplated.

In addition to providing energy for propulsion, the traction battery 24 may provide energy for other vehicle electrical systems. The vehicle 12 may include a DC/DC converter controller 28 that is electrically coupled to the high voltage bus 54. The DC/DC converter controller 28 may be electrically coupled to a low voltage bus 56. The DC/DC converter controller 28 may convert the high voltage DC output of the traction battery 24 and/or the power electronics controller 26 to a low voltage DC supply that is compatible with low voltage vehicle loads connected to the low voltage bus 56. In one example, the low voltage bus 56 may be electrically coupled to an auxiliary battery 30 (e.g., 12V battery). In another example, low voltage systems 52, such as, but not limited to, accessories, lighting, and so on, may also be electrically coupled to the low voltage bus 56.

One or more high voltage electrical loads 46 may be coupled to the high voltage bus 54A. The high voltage loads 46 may have an associated controller that operates and controls the high voltage electrical loads 46 when appropriate. The high voltage loads 46 may include compressors and electric heaters. The various components discussed may have one or more associated controllers to control and monitor the operation of the components. The controllers may communicate via a serial bus (e.g., Controller Area Network (CAN)) or via discrete conductors.

During a continuous discharge, i.e., charge depletion, operation, applying a large discharge current/power demand after a sustained discharge operation, may cause a voltage drop in cell 68 and/or battery 24 voltage to a voltage less than a predefined voltage threshold. FIG. 1A illustrates an example graph 100-A of a change in measured voltage 102 with respect to a drive cycle time 104. In one example, measured voltage 106 may be a first voltage 106a at a first time $t_1$ 108 and a second voltage 106b at a second time $t_2$ 110 subsequent the first time $t_1$ 108. In some instances, the first and second times 108, 110 may illustrate first and second voltage measurements received by the battery controller 50, respectively, such that a difference between the first and second times 108, 110 may be a time elapsed between two consecutive voltage 106 measurements.

FIG. 1B illustrates an example graph 110-B of a change in measured voltage 102 with respect to a drive cycle time 104. In some instances, the measured voltage curve 106, as shown in FIG. 1B, may be representative of a detailed view of one or more portions of the measured voltage curve 106 illustrated in FIG. 1A. The battery controller 50 may be configured to detect a nonlinear voltage drop based on a decrease in voltage 106 between certain instances of time and/or between consecutive measurements is greater than a predefined voltage threshold. As one example, the battery controller 50 may detect a nonlinear voltage drop when voltage 106 changes from a first voltage value measured at time 112 to a second voltage value measured at time 114. The difference between times 112, 114 may be indicative of a predefined period of time elapsed between consecutive measurements. As another example, the battery controller 50 may detect that a decrease in voltage between times 116 and 118 and/or times 120 and 122 is less than a predefined voltage threshold and is therefore, linear (or not nonlinear). A period of time elapsed between times 116 and 118 may be same or different as that of times 120 and 122 and times 112 and 114.

A voltage difference $V_{diff}$ may be a difference between the first and second voltages 106a, 106b. The battery controller 50 may compare the voltage difference $V_{diff}$ to a predefined voltage threshold. In some instances, responsive to the voltage difference $V_{diff}$ being greater than the voltage threshold, the battery controller 50 may be configured to decrease (or reduce) predicted available battery power. The battery controller 50 may determine, based on the voltage difference $V_{diff}$, that the voltage value may decrease toward a predefined voltage value during the pulse, even though the cell 68 and/or the traction battery 24 in its entirety was predicted to be at a voltage greater than the actual voltage for a given current pulse at a present SOC level. Normally, for short duration moderate current pulsing, the battery voltage response may be linear. But the battery may experience a nonlinear voltage drop with routine accelerations while driving at moderate to high speeds (e.g. 'passing' maneuver on the highways). The available battery discharge power, during such conditions, may become less than a predicted available battery power corresponding to a present SOC level with a given current pulse if the battery 24 was not operating in sustained discharge conditions.

The current sensor and voltage sensor outputs of the traction battery 24 are provided to the battery controller 50. The battery controller 50 may be configured to monitor the SOC based on signals from one or more sensors, such as current and voltage sensors of the traction battery 24. Various techniques may be utilized to determine the SOC. For example, an ampere-hour integration may be implemented in which the current through the traction battery 24 is integrated over time. The SOC may be estimated based on, for example, the output of a traction battery voltage sensor. The specific technique utilized may depend upon the chemical composition and characteristics of the particular battery.

An SOC operating range may be defined for the traction battery 24. The operating ranges may define an upper and lower SOC thresholds, e.g., $SOC_{max}$ and $SOC_{min}$, of the traction battery 24. The traction battery 24 of vehicle 12 may be recharged by an external power source 36 electrically coupled to an electric vehicle supply equipment (EVSE) 38, i.e., a charger or a charging station. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12 and may be electrically coupled to an on-board power conversion controller 32 that conditions the power supplied from the EVSE 38 to provide the proper voltage and current levels to the traction battery 24. Additionally or alternatively, the vehicle 12 may be configured to receive wireless power transfer via a wireless connection to the EVSE 38, such as, but not limited to, inductive charging over-the-air-gap.

From the battery physics perspective, lithium ion transport to the reaction site and the rate of reactions determine the apparent resistance of the battery. The rates of ion transport and the rates of reactions vary during the battery usage and are also dependent on the prior usage history within the same drive profile. During a sustained discharge operation if there is a demand for large power/current from the battery, Li-ion transport to the reaction sites at the electrode surface and/or the reaction rates at the electrode surface may reach their respective maximum values prior to the power/current demand being met. Such an occurrence may result in nonlinear increase in apparent cell resistance. This may cause the battery actual available power to be less than amount of the demanded power.

The traction battery 24 may include a plurality of cells arranged in series and/or parallel configuration. In some examples, every cell of the traction battery may experience the nonlinear drop in voltage and the pack voltage may become less than a predefined voltage threshold that, in turn, causes a nonlinear reduction of available battery discharge power. In some other examples, only the weakest cell (cell having smallest capacity and/or highest resistance) may experience nonlinear increase in apparent resistance and/or reach cell voltage less than a threshold voltage. Though, this may not be easily observable at the pack voltage level, this may cause the power management system to abruptly reduce the projected battery discharge power capability to avoid over-discharge of that particular cell, because, such a cell may reach the minimum allowable voltage $V_{min}$. In still other examples, multiple cells, but not all cells, in the pack may experience the nonlinear decrease in voltage during high power/current demand in a sustained discharge operation. This voltage drop of certain cells may or may not be easily observable at the pack voltage level depending upon the number of cells experiencing this condition. Again, this may cause the power management system to reduce the battery discharge power capability to avoid over discharge of the cells with larger voltage drop.

Figure 2A:
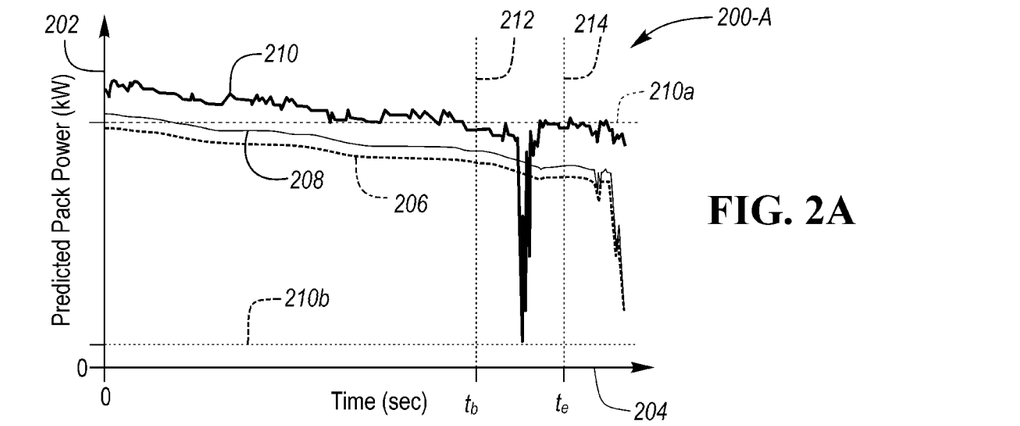
FIGS. 2A-2C are graphs illustrating example predicted power during a battery discharge event.

During vehicle operation, the battery controller 50 may be configured to determine predicted battery power $P_{pack\_predicted}$ based on at least one of power limit tables (PLT) and power capability processing (PCP) algorithm. In one example, the battery controller 50 may select a smaller one of the predicted available battery power $P_{pack\_predicted}$ values resulting from the power limit tables and power capability processing algorithm. FIG. 2A illustrates an example graph 200-A of a change in predicted pack power 202 with respect to time 204 during a continuous discharge operation of the battery 24. A power curve 206 may be indicative of a long term predicted battery power $P_{pack\_long\_PLT}$ determined using the power limit tables. A power curve 208 may be indicative of a short term predicted battery power $P_{pack\_shrt\_PLT}$ determined using the power limit tables. A power curve 210 may be indicative of a short term predicted battery power $P_{pack\_shrt\_PCP}$ determined using the power capability processing algorithm.

Figure 2B:
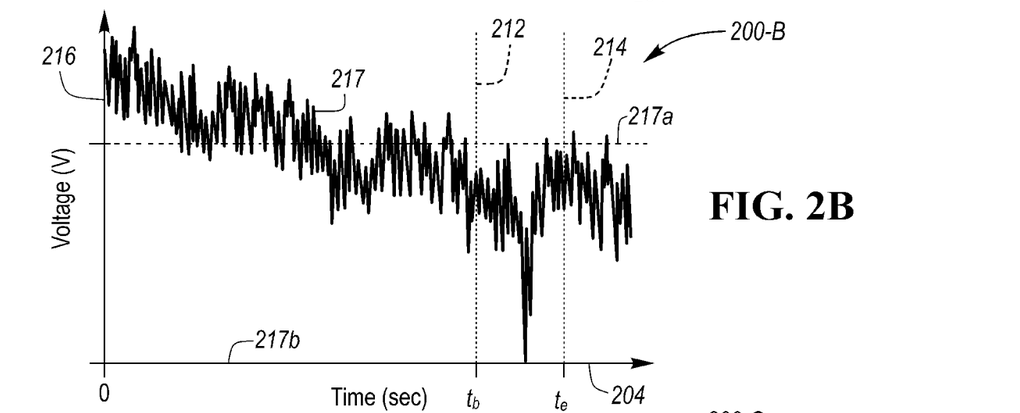

One or more cells 68 in the battery pack may experience a power capability reduction during the discharge operation. In one example, the battery controller 50 may reduce the short term predicted battery power $P_{pack\_skirt\_PCP}$ 210 from a first predicted power 210a to a second predicted power 210b between a beginning time $t_b$ 212 and an ending time $t_e$ 214. If a difference between the first and second predicted powers 210a and 210b exceeds a predefined power reduction rate threshold, the voltage of the entire pack may drop at or about a same time as the predicted power reduction. FIG. 2B illustrates an example graph 200-B of a change in cell/pack voltage 216 with respect to time 204 during a continuous discharge operation of the battery 24 and at or about a same time as a change in the predicted pack power 206 illustrated in FIG. 2A. A voltage curve 217 indicates that cell/pack voltage values decreased from a first voltage 217a to a second voltage 217b between the beginning time $t_b$ 212 and the ending time $t_e$ 214.

Since, the PCP algorithm uses the pack voltage measurement as one of its inputs for the Extended Kalman Filter (EKF), it can predict the power availability reduction during a linear voltage decrease. Nevertheless, since PCP prediction is an instantaneous prediction of power based on the voltage and current measurements, in certain cases, the rate of power reduction dP/dt may be sizeable when the battery voltage reduction is greater than a predefined voltage threshold, e.g., when the voltage reduction is nonlinear, a rate of power reduction may, for example, be 30 kW/sec.

Figure 2C:
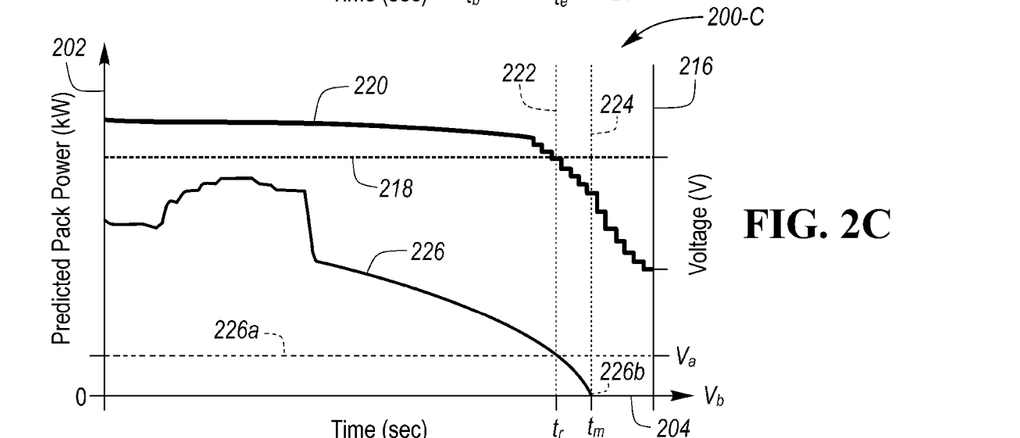

FIG. 2C illustrates an example graph 200-C for beginning a reduction of predicted power, by the battery controller 50. The graph 200-C may include a change in the predicted pack power 202 with respect to time 204 and further a change in voltage 216 at or about a same time as the change in the predicted pack power. Power curves 218 and 220 may be indicative of contemporaneous changes in the power limit tables predicted battery power $P_{pack\_long\_PLT}$ and in the power capability processing algorithm power $P_{pack\_shrt\_PCP}$, respectively. A voltage curve 226 may be indicative of a change in cell/pack voltage at or about a same time as the changes in predicted pack power. In some examples, the graph 200-C may be indicative of a detailed view of one or more portions of the graph 200-A and/or the graph 200-B. The power curve 218 may, for instance, be representative of a portion of the power curve 206, the power curve 220 may be representative of a portion of the power curve 210, and the voltage curve 226 may be representative of a portion of the voltage curve 217.

During continuous discharge operation, battery power capability reduction rate dP/dt may be greater than a predefined threshold rate of reduction, e.g., a threshold rate of 5 kW/s. The battery controller 50 may begin reducing the predicted power $P_{predicted}$ at a reduction time $t_r$ 222 in response to detecting that the power capability processing algorithm power $P_{pack\_shrt\_PCP}$ is less than the power limit tables predicted battery power $P_{pack\_long\_PLT}$. If the battery controller 50 continues to provide predicted battery power $P_{predicted}$ when a rate of power capability reduction dP/dt is greater than the threshold rate, a degradation in performance may result.

On the other hand, if the battery controller 50 takes into consideration the power rate of reduction dP/dt being greater than a predefined threshold rate of reduction during continuous discharge operation, the degradation in performance and customer dissatisfaction may be avoided. In one example, consideration of rate of reduction dP/dt of available battery power may enable the battery controller 50 to begin reducing predicted battery power, thereby reducing battery propulsion power contribution and activating the engine 18 to assist in meeting a power demand. Also, such consideration of the power rate of reduction dP/dt by the battery controller 50, when determining predicted available battery power $P_{predicted}$, may reduce instances of invoking power limiting conditions during continuous discharge operation and/or increasing length of time the vehicle 12 continually operates in electric-only mode, i.e., EV mode.

In the instance when only a weakest cell 68, e.g., the cell 68 having smallest capacity value and/or greatest resistance relative to one or more other cells 68, in the pack 24 experiences the nonlinear increase in apparent resistance during PHEV operation, the resulting nonlinear voltage drop of that cell 68 may have undetectable effect on the voltage of the entire pack 24. Thus, power capability processing calculations, which are based on the pack voltage, may not reflect the reduction in power capability of the pack 24 until the voltage of that particular cell 68 drops to the operation limiting voltage. For example, as shown in FIG. 2C, the pack/cell voltage 226 may decrease from a first voltage $V_a$ 226a at the reduction time $t_r$ 222 to a second voltage $V_b$ 226b at a time $t_m$ 224, wherein the second voltage $V_b$ 226b may be within a predefined threshold of minimum voltage $V_{min}$ of the cell/pack.

Thus, when the battery controller 50 determines the predicted battery power $P_{predicted}$ using the power capability processing algorithm and is not aware of nonlinear voltage changes for a single cell 68, the battery controller 50 may rely on alternative safeguard mechanisms, e.g., power limits, to avoid the over-discharge of that particular cell 68. In some instances, the battery controller 50 may reduce the predicted available battery power at a rate greater than a predefined threshold rate, e.g., at a rate greater than necessary for efficient battery 24 operation. This may again affect vehicle performance and/or customer experience. Responsive to an early detection of a nonlinear drop in voltage of individual cells 68 during continuous discharge, the battery controller 50 may begin earlier a reduction of the predicted available battery power $P_{predicted}$ to ensure smooth vehicle operation. Additionally or alternatively, such early detection may be beneficial to the vehicles 10 operating in areas with cold climate conditions where high cell resistances may limit the discharge power.

When multiple, but not all, battery cells 68 undergo nonlinear voltage drop during the discharge operation, the battery controller 50 may detect an increase in apparent resistance from the battery 24 voltage measurements. Nevertheless, if the battery controller 50 changes the predicted battery power $P_{predicted}$ using computing methodologies based on the voltage and current measurements, e.g., such as the PCP algorithm, the rate of reduction of predicted power dP/dt may be greater than a predefined reduction rate threshold in scenarios where a total number of the cells 68 experiencing nonlinear voltage drop is smaller than a threshold voltage drop, e.g., nonlinear voltage drop detectable by the battery controller 50. Thus, in this case also, an early detection of nonlinear drop in cell 68 voltages may be desirable and may improve operation the vehicle 10 and customer experience.

When the cell voltage rate of reduction is greater than a predefined threshold rate of reduction, e.g., rate of reduction is nonlinear, the apparent resistance of cell may increase rapidly. During such an occurrence, the rate of increase of resistance may exceed a predefined threshold value. The battery controller 50 may be configured to detect upcoming excessive voltage drop conditions.

The battery controller 50 may be configured to determine and/or adjust predicted available battery power $P_{predicted}$ during nonlinear voltage drop events. The battery controller 50 may be further configured to predict an increased possibility of nonlinear decrease in cell/battery voltage. Upon detecting the increased possibility, the battery controller 50 may begin decreasing the predicted available battery power $P_{predicted}$ such that a rate of reduction of predicted powet dP/dt is less than a predefined reduction rate threshold, e.g., less than the reduction rate that causes activation of battery 24 power limits. During discharge operation, once such a possibility is detected, the battery controller 50 may be configured to reduce the power capability predictions to prevent and/or reduce battery 24 operation under stress.

In one example, the battery controller 50 may continuously monitor current demand and voltage response of some or all battery cells 68 during discharge. The battery controller 50 may be further configured to estimate the resistance of the cells 68 (or pack 24) and the rate of change of resistance of the cells 68 (or pack 24) based on the detected values of voltage and/or current. In another example, the battery controller 50 may determine that cell/pack voltage drop is nonlinear, responsive to two or more measurements taken consecutively, e.g., measurements whose difference in time domain is dt=0.1 sec, resulting in the discharge current being above a threshold current, the voltage of the cell 68 decreasing or trending toward a predefined minimum voltage $V_{min}$, the resistance of the cell 68 being above a predefined resistance threshold, rate of change of resistance being above a certain resistance rate threshold. In still another example, responsive to detecting reduced battery power condition, the battery controller 50 may be configured to begin decreasing predicted available battery power $P_{predicted}$ so that the rate of power change dP/dt is gradual, i.e., the rate of power change dP/dt is less than a predefined power rate threshold.

The battery controller 50 may detect that a reduced power condition is present in response to battery 24 voltage being below a predefined voltage threshold, i.e., $V(t+\Delta t)<V(t)$, apparent resistance of the cell being above a predefined resistance threshold, i.e., $R>R_{critical}$, the rate of resistance increase being above a predefined resistance rate threshold, i.e., $$\frac{dR}{dt} > \frac{dR}{dt}_{critical};$$

discharge current, e.g., according to a battery current sign convention of discharge current being negative value, being greater than a predefined current threshold, i.e., $I<I_{min}<0$. In some instances, the battery controller 50 may determine that a reduced power condition is present in response to detecting all the aforementioned conditions for two or more consecutive measurements during continuous discharge operation.

The battery controller 50 may determine apparent resistance R of the cell based on open circuit voltage $V_{OCV}$, that, in turn, may be based on current battery SOC and the terminal voltage $V_t$ measured across the battery cell/pack, or $$R = \frac{V_t - V_{OCV}}{I}. \tag{1}$$

The battery controller 50 may be configured to determine the resistance rate of change dR/dt based on Equation (2) of:

$$\frac{dR}{dt} = \frac{R(t+\Delta t) - R(t)}{\Delta t}. \tag{2}$$

Figure 3:
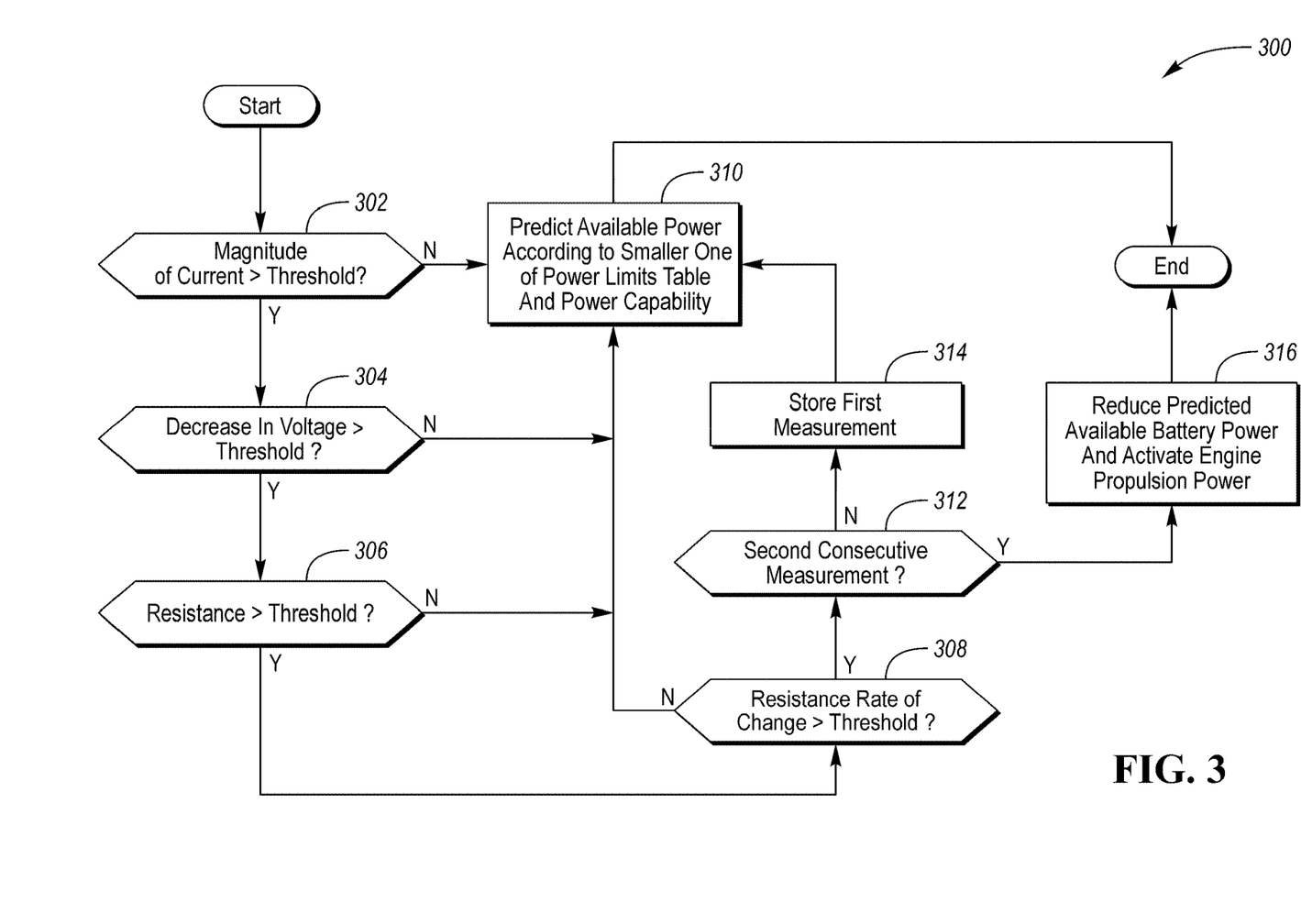
FIG. 3 is a flowchart illustrating an algorithm for responding to a nonlinear decrease in measured voltage.

FIG. 3 illustrates an example process 300 for determining estimated available battery power. The process 300 may begin at operation 302 where the battery controller 50 determines whether magnitude of discharge current is greater than a predefined current threshold. If the charge current is less than the current threshold, the battery controller 50 may determine, at operation 310, that the estimated available battery power is a smaller one of the power values based on power limits table and power capability prediction algorithm.

The battery controller 50 may proceed to operation 304 responsive to magnitude of discharge current being greater than a predefined current threshold. At operation 304, the battery controller 50 may determine whether voltage decrease, or voltage rate of change, is greater than a predefined voltage threshold. If the voltage rate of change is less than the voltage threshold, the battery controller 50 may proceed to operation 310 where it determines the estimated available battery power based on a smaller one of the power values of the power limits table and the power capability prediction algorithm.

The battery controller 50 may proceed to operation 306 responsive to voltage rate of change being greater than the voltage threshold. At operation 306, the battery controller 50 may determine whether apparent cell/battery pack resistance is greater than a predefined resistance threshold. If the resistance is less than the resistance threshold, the battery controller 50 may proceed to operation 310. Moreover, responsive to detecting that the resistance is greater than the resistance threshold, the battery controller 50, at operation 308, may determine whether resistance rate of change is greater than a predefined resistance rate of change threshold. If the resistance rate of change is less than the corresponding rate of change threshold, the battery controller 50 may proceed to operation 310.

In response to determining, at operation 308, that the resistance rate of change exceeds the corresponding rate of change threshold, the battery controller 50 determines whether the occurrence is detected for a second consecutive measurement at operation 312. If not, the battery controller 50 may store the first measurement occurrence in a data store, at operation 314, and determine the estimated available battery power based on a smaller one of the power values of the power limits table and the power capability prediction algorithm.

If the occurrence is detected for a second consecutive measurement, the battery controller 50, at operation 316, may determine the estimated available battery power based on a smaller one of the power values of the power limits table, the power capability prediction algorithm, and a predefined operation minimum voltage limit (OMVL). In one example, estimated available battery power based on the operation minimum voltage limit may be less than that of the power limits table and/or the power capability algorithm. Thus, the battery controller 50 may reduce estimated available battery power to be contributed by the traction battery 24 to meet current power demand and may activate the engine to assist in providing required propulsion power. The process 300 may then end. In some instances, the process 300 may be repeated in response to receiving one or more of current and voltage values, or in response to receiving a different parameter value.

FIGS. 4A-4D illustrate graphs 400-A, 400-B, 400-C, and 400-D, respectively, representative of parameter values of an example cell 68 during a predefined drive cycle at room temperature. A correlation between apparent resistance R and a resistance rate of change dR/dt may be further affected by measured values of voltage V and current I of the example cell 68. The graphs 400-A, 400-B, 400-C, and 400-D may illustrate filtering, by the battery controller 50, of change in resistance dR/dt 402 with respect to resistance R 404 responsive to one or more conditions being met. In one example, the battery controller 50 may filter (select) one or more values of resistance rate of change dR/dt and resistance R corresponding to predefined thresholds in response to detecting that one or more other conditions are being met.

Figure 4A:
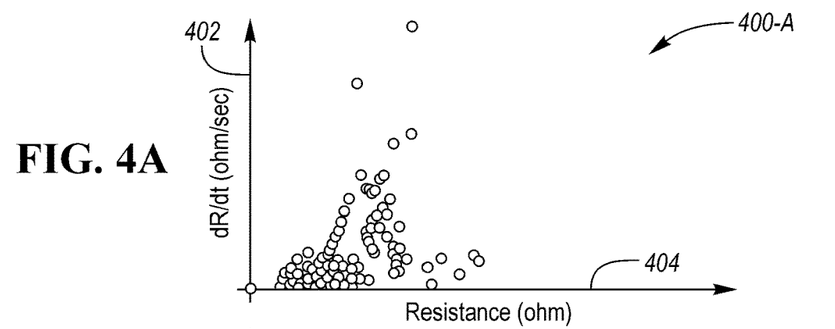
FIGS. 4A-4D are graphs illustrating example change in resistance based on measured voltage and current.

As shown in FIG. 4A, the battery controller 50 may select a plurality of resistance rate of change dR/dt values in response to both decreasing cell/pack voltage, e.g., $V(t+\Delta t) < V(t)$, and discharge current, e.g., according to a battery current sign convention of discharge current being negative value, being greater than a predefined current threshold, i.e., $I < I_{min} < 0$. The battery controller 50, as shown in FIG. 4B, may select the resistance rate of change dR/dt values in response to both apparent resistance R being greater than a predefined resistance threshold and resistance rate of change dR/dt being greater than a predefined resistance rate threshold.

Figure 4B:
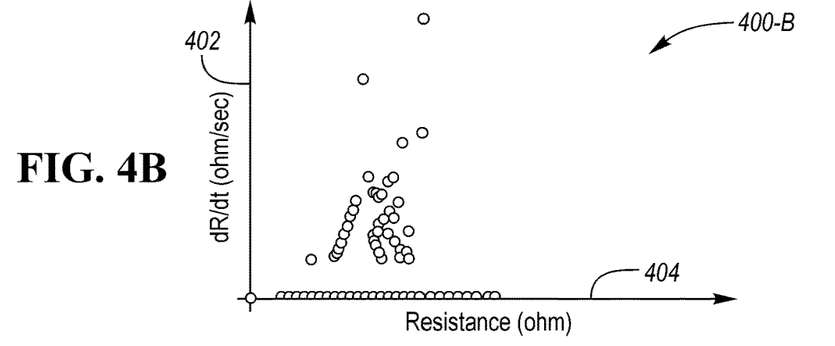
Figure 4C:
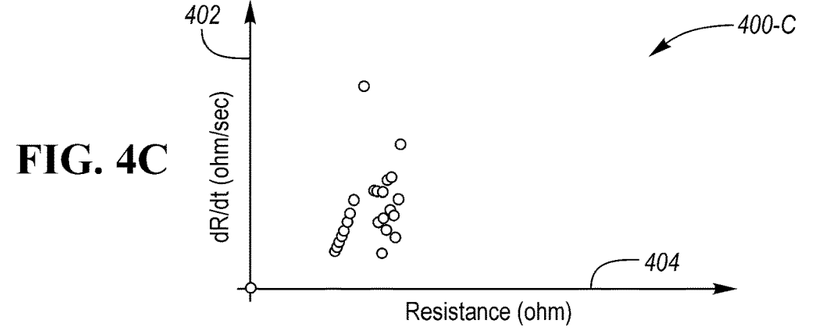
Figure 4D:
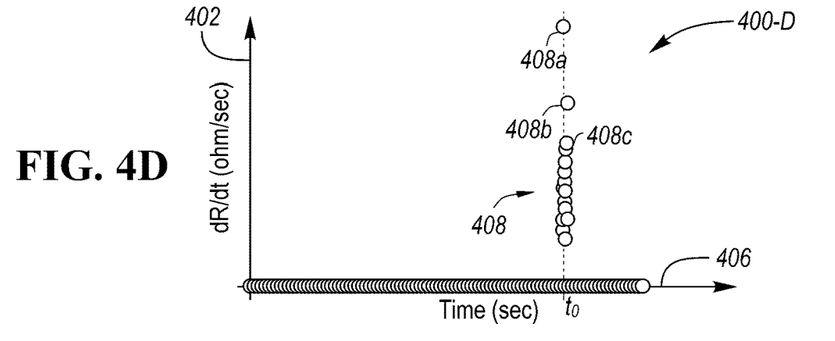

In reference to FIG. 4C, the battery controller 50 may select the resistance rate of change dR/dt values and the corresponding resistance R values in response to detecting that the filtering conditions of FIGS. 4A-4B have been for a predefined number of consecutive measurements. FIG. 4D illustrates values of the resistance rate of change dR/dt 408, i.e., values of the resistance rate of change dR/dt that meet the filtering conditions of the graphs 400-A, 400-B, and 400-C, occurring with respect to time 406. In some instances, in response to detecting occurrence of the resistance rate of change dR/dt 408 at a time $t_0$ 410, the battery controller 50 may determine that at, or about, time $t_0$ 410 decrease in voltage, e.g., voltage rate of change, is greater than a predefined voltage rate threshold. Thus, the battery controller 50 may determine occurrences of nonlinear voltage rate of change to a voltage value less than a predefined voltage threshold based on the values of resistance rate of change dR/dt 408 resulting from the filtering stages illustrated in the graphs 400-A, 400-B, and 400-C.

While the example calculations described in reference to at least FIGS. 4A-4D may be performed with respect to a single battery cell 68, the value selection is not limited thereto. Thus, the battery controller 50 may be configured to perform similar calculations for a plurality of cells 68, cell modules 74, and/or the entire traction battery 24. When determining parameter values of a combination of cells, the battery controller 50 may adjust threshold values to correspond to a number of cells 68 being evaluated prior to comparing each of the values of voltage V, resistance R, and resistance rate of change dR/dt to their respective thresholds. The battery controller 50 may determine the adjusted threshold using algebraic calculations and/or based on the internal connections, e.g., series, parallel, and so on, between the plurality of cells 68 being evaluated. For example, if the algorithm is applied to n cells connected in series with one another, the effective resistance may be calculated as $$R_{n\_cells} = \sum_{i=1}^{n} R_{cell,i} + R_{harness}.$$

Additionally or alternatively, the battery controller 50 may determine voltage of the traction battery 24 based on Equation (3), or:

$$V_{pack} = \sum_{i=1}^{n} V_i. \tag{3}$$

Figure 5A:
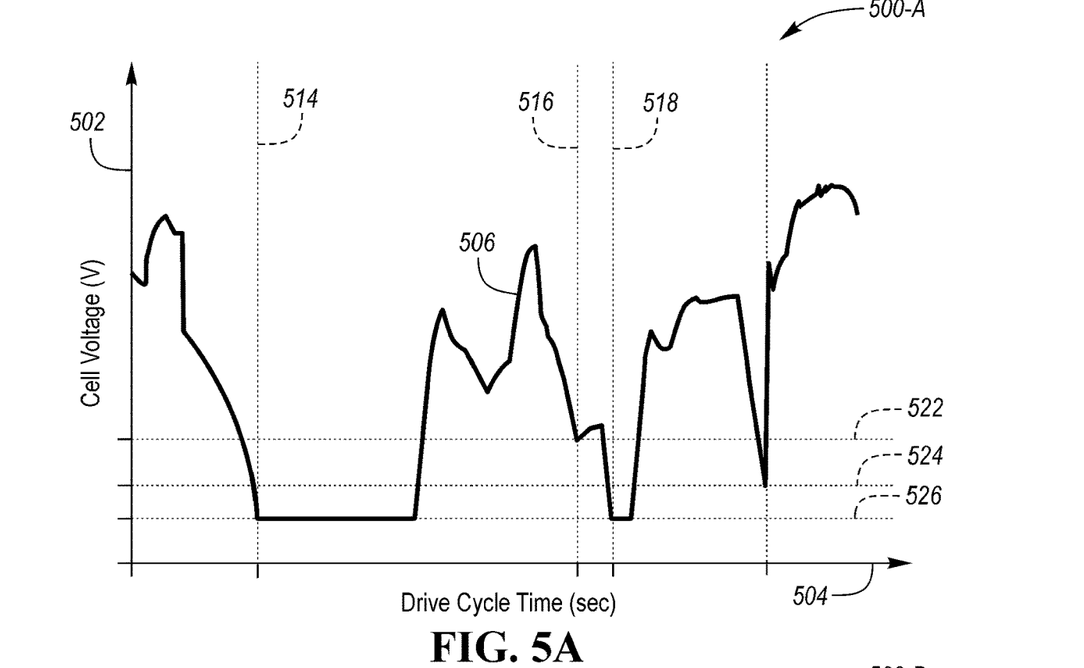
FIGS. 5A-5B are graphs illustrating example change in measured voltage during a drive cycle.
Figure 5B:
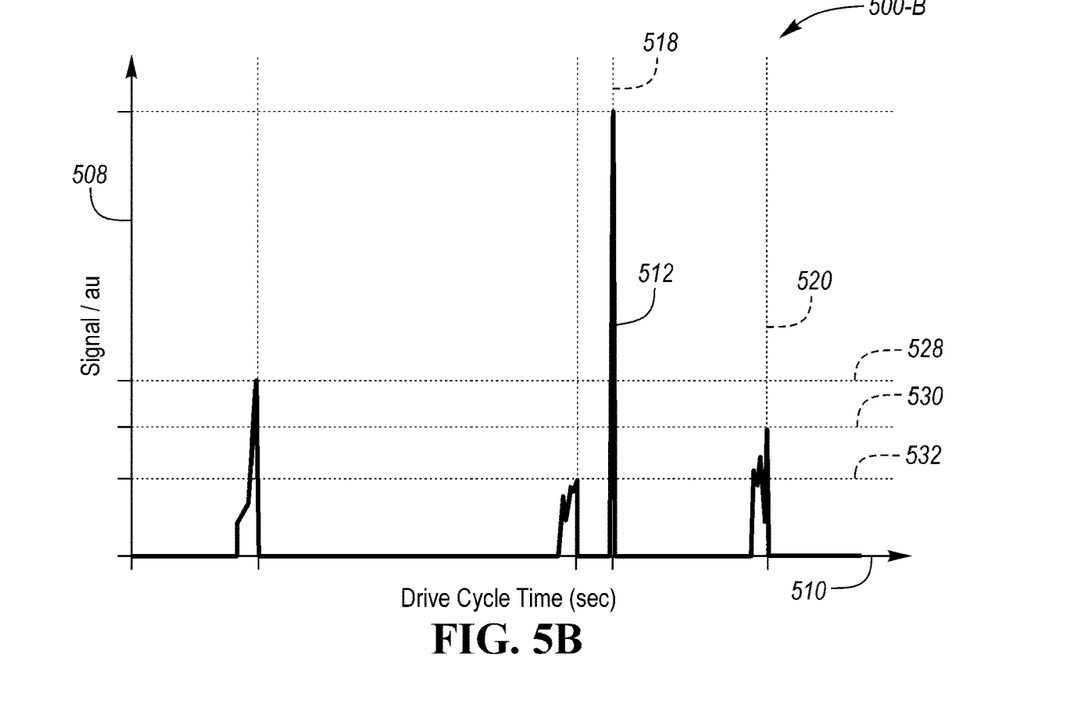

FIG. 5A illustrates a graph 500-A of cell voltage 502 with respect to a drive cycle time 504. The change in cell voltage $V_{cell}$ 506 may correspond to high current pulses, such as, but not limited to, high power demands, and so on. At one or more instances 514, 516, 518, and 520 during the example drive cycle test, rate of decrease in the cell voltages $V_{cell}$ may be greater than a predefined voltage decrease threshold. In one example, the battery controller 50 may determine power capability reduction events.

As cell voltage $V_{cell}$ decreases over time and values of the cell apparent resistance R and/or cell resistance rate of change dR/dt correspondingly increase, a threshold signal value (for both the apparent resistance R and the resistance rate of change dR/dt) may be selected such that the forecasting of a possible occurrence of reduction in cell power capability is consistent with power limits associated with operation of the traction battery 24. In one example, responsive to the cell voltage $V_{cell}$ being less than a predefined minimum voltage $V_{min}$, the battery controller 50 may activate one or more power limits associated with operation of the traction battery 24. Additionally or alternatively, the battery controller 50 may select threshold values for both the apparent resistance R and the resistance rate of change dR/dt to prevent the corresponding power limit from being triggered.

Figure 6:
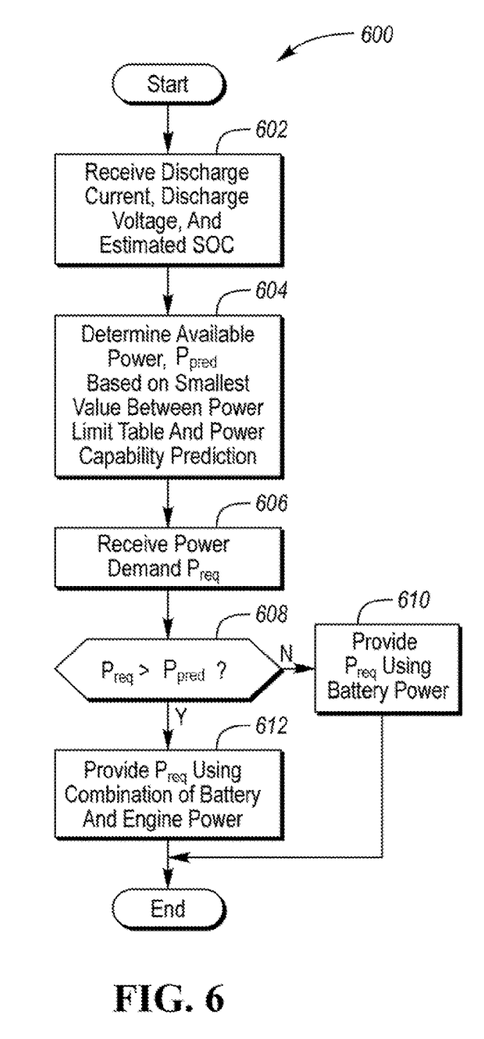
FIG. 6 is a flowchart illustrating an algorithm for predicting available battery propulsion power.

FIG. 6 illustrates an example process 600 for predicting available battery power $P_{predicted}$ (hereinafter, $P_{pred}$), and may be performed by the battery controller 50, as described in reference to at least FIG. 1C. The process 600 may begin at operation 602 where the battery controller 50 receives one or more values of discharge current, discharge voltage, and estimated SOC. The parameter values of the current, voltage, SOC, and so on may correspond to those of a single battery cell, a combination of battery cells, or an entire battery pack. At operation 604, the battery controller 50 may determine predicted available battery power $P_{pred}$ by selecting a smaller one of the power values obtained using the power limits table and the power capability prediction algorithm.

The battery controller 50 may receive a demanded power value $P_{req}$ at operation 606. The battery controller 50, at operation 608, may determine whether the demanded power value $P_{req}$ is greater than the estimated available battery power $P_{pred}$. Responsive to determining that the demanded power value $P_{req}$ is less than the predicted available battery power $P_{pred}$, the battery controller 50, at operation 610, may meet current power demand $P_{req}$ using the traction battery. At operation 612, responsive to the demanded power value $P_{req}$ being greater than the predicted available battery power $P_{pred}$, the battery controller 50 may meet current power demand $P_{req}$ using a combination of power provided by the traction battery and the engine. The process 600 may then end. In some instances, the process 600 may be repeated in response to receiving one or more values of discharge current, discharge voltage, and estimated SOC of the cell/battery pack.

Figure 7:
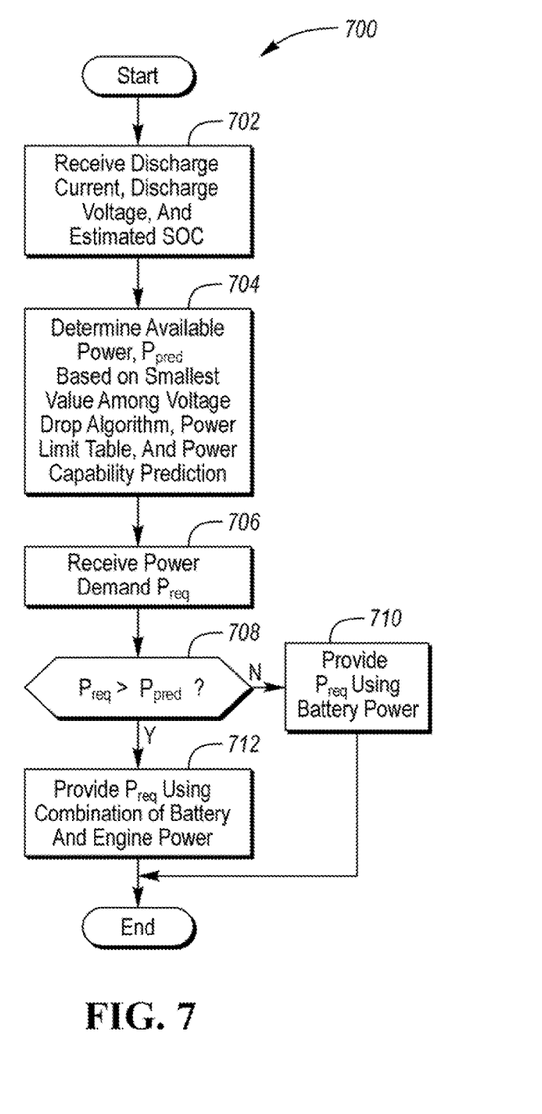
FIG. 7 is a flowchart illustrating an algorithm for predicting the available power based on nonlinear change in measured voltage.

FIG. 7 illustrates an example process 700 for estimating available battery power based on resistance rate of change of the cell/battery pack. The process 700 may begin at operation 702 where the battery controller 50 receives one or more values of discharge current, discharge voltage, and estimated SOC. The parameter values of the current, voltage, SOC, and so on may correspond to those of a single battery cell, a combination of battery cells, or an entire battery pack. At operation 704, the battery controller 50 may determine the predicted available battery power $P_{pred}$ by selecting a smaller one of the power values obtained using the voltage drop analysis, the power limits table, and the power capability prediction algorithm.

The battery controller 50 may receive a demanded power value $P_{req}$ at operation 706. The battery controller 50, at operation 708, may determine whether the demanded power value $P_{req}$ is greater than the predicted available battery power $P_{pred}$. Responsive to determining that the demanded power value $P_{req}$ is less than the predicted available battery power $P_{pred}$, the battery controller 50, at operation 710, may meet current power demand $P_{req}$ using the traction battery. At operation 712, the battery controller 50 may meet current power demand $P_{req}$ using a combination of power provided by the traction battery and the engine responsive to the demanded power value $P_{req}$ being greater than the predicted available battery power $P_{pred}$. The process 700 may then end. In some instances, the process 700 may be repeated in response to receiving one or more values of discharge current, discharge voltage, and estimated SOC of the cell/battery pack.

Figure 8A:
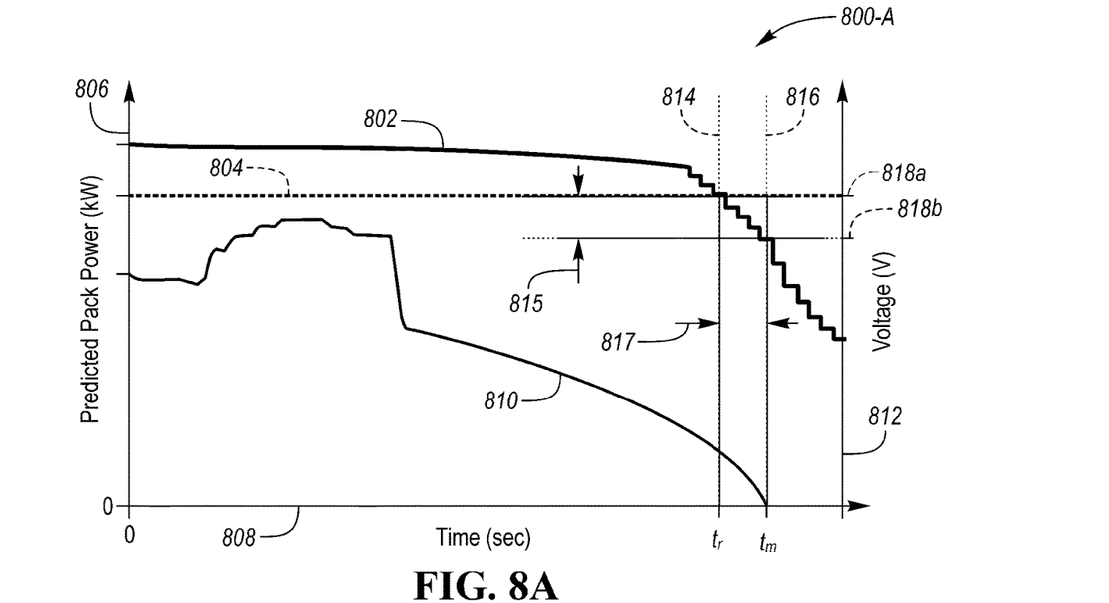
FIGS. 8A-8B are graphs illustrating forecasted available battery power.
Figure 8B:
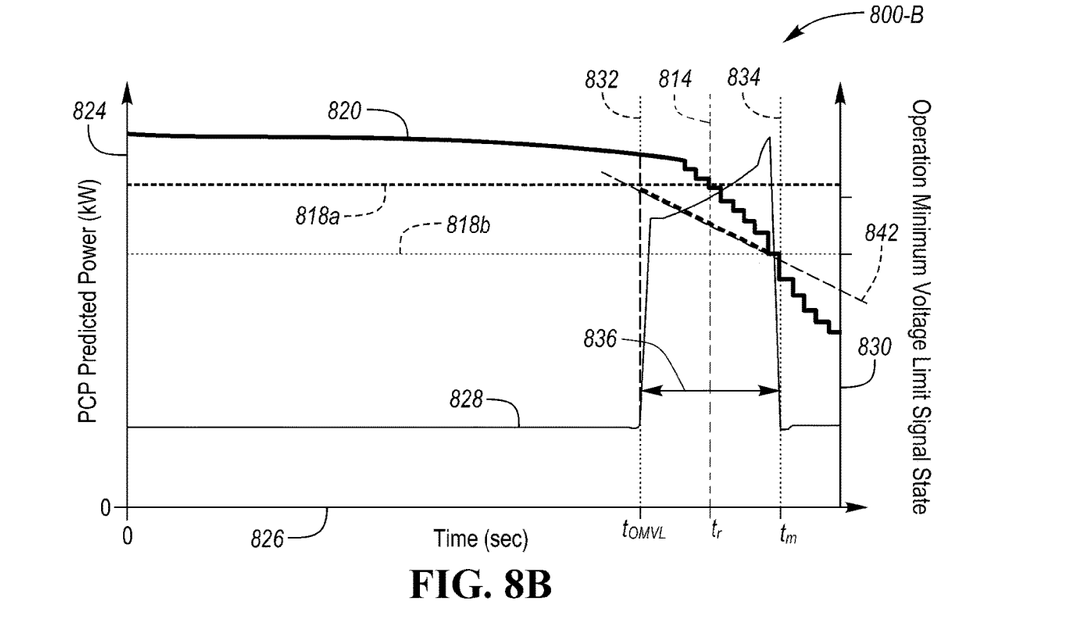

FIGS. 8A-8B illustrate example graphs 800-A and 800-B, respectively, for predicting available battery power. FIG. 8A illustrates an example graph 800-A for beginning a reduction of predicted available power by the battery controller 50. The graph 800-A may include a change in the predicted pack power 806 with respect to time 808 and further a change in voltage 812 at or about a same time as the change in the predicted pack power. Power curves 804 and 802 may be indicative of contemporaneous changes in the power limit tables predicted battery power $P_{pack\_long\_PLT}$ and in the power capability processing algorithm power $P_{pack\_shrt\_PCP}$, respectively. While the power curves 804 and 802 described in reference to FIG. 8A may be indicative of changes in PLT- and PCP-based power predictions, respectively, the description is not limited thereto. In some instances, the power curve 804 may be indicative of long-term power predictions based on the power limits table and the power curve 802 may be indicative of short-term power predictions based on a combination of the power limits table and the PCP algorithm.

A voltage curve 810 may be indicative of a change in cell/pack voltage at or about a same time as the changes in predicted pack power. In some examples, the graph 800-C may correspond to one or more portions of the graph 200-C and/or the graphs 200-A and 200-B. The power curve 804 may, for instance, be representative of a portion of the power curve 206, the power curve 802 may be representative of a portion of the power curve 210, and the voltage curve 810 may be representative of a portion of the voltage curve 217.

The battery controller 50 may begin reducing the predicted power $P_{predicted}$ at a reduction time $t_r$ 814 in response to detecting that the power capability processing algorithm power $P_{pack\_shrt\_PCP}$ 802 is less than the power limit tables predicted battery power $P_{pack\_long\_PLT}$ 804. The battery controller 50 may, for example, set the predicted available battery power to be a power value P', or a smaller one of the values of the power curves 802 and 804. The cell/pack voltage 810 may reach a predefined minimum voltage threshold at a time $t_m$ 816, such that an elapsed time 817 between the time $t_r$ 814 and the time $t_m$ 816. The battery controller 50 may reduce the predicted available battery power $P_{predicted}$ from a first predicted power 818a at the time $t_r$ 814 to a second predicted power 818b at the time $t_m$ 816. A difference d 815 between the first and second predicted powers 818a and 818b may be indicative of a value of decrease of $P_{predicted}$ and a predicted power rate of reduction dP/dt may be determined based on the difference 815 with respect to the elapsed time 817.

FIG. 8B illustrates the graph 800-B for determining the long-term power prediction based on a smallest one of the power limits table value, the PCP algorithm value, and the resistance rate of change. The graph 800-B may include a change in the predicted pack power 824 with respect to time 826 and further a state of an operation minimum voltage signal 830 at or about a same time as the change in the predicted pack power 824. Power curves 822 and 820 may be indicative of relative values of the power limit tables predicted battery power $P_{pack\_long\_PLT}$ and in the power capability processing algorithm power $P_{pack\_shrt\_PCP}$, respectively. In one example, prior to detecting a state change in the operation minimum voltage signal 828 a time $t_{OMVL}$ 832, the battery controller 50 may set the predicted available battery power $P_{predicted}$ to correspond to the short-term predicted power $P_{pack\_shrt\_PCP}$ 820.

In response to detecting a state change (e.g., from inactive to active) in the operation minimum voltage signal 828 at the time $t_{OMVL}$ 832, the battery controller 50 may set the predicted available battery power $P_{predicted}$ to correspond to a smaller one of the power limit tables predicted battery power $P_{pack\_long\_PLT}$ 822 and the power capability processing algorithm power $P_{pack\_shrt\_PCP}$ 820. In some examples, the state change of the operation minimum voltage signal 828 from inactive to active may correspond to one or more predefined operating conditions, such as, but not limited to, battery voltage being less than a predefined voltage threshold, i.e., $V(t+\Delta t)<V(t)$, cell/pack apparent resistance being above a predefined resistance threshold, i.e., $R>R_{critical}$, the rate of resistance increase being above a predefined resistance rate threshold, i.e., $$\frac{dR}{dt} > \frac{dR}{dt}_{critical},$$

discharge current, e.g., according to a battery current sign convention of discharge current being negative value, being greater than a predefined current threshold, i.e., $I<I_{min}<0$. In some other instances, the state change of the operation minimum voltage signal 828 from inactive to active may be in response to detecting that all aforementioned conditions occurred for two or more consecutive measurements during continuous discharge operation. The battery controller 50 may be configured to determine predicted available battery power $P_{predicted}$ based on one or more of voltage measurement of the entire pack, voltage measurement of each individual cells in the pack, and voltage measurement of cell modules or select cells.

The battery controller 50, prior to detecting a state change of the signal 828 from active to inactive, may continue to set the predicted available battery power $P_{predicted}$ to correspond to a smaller one of the power limit tables predicted battery power $P_{pack\_long\_PLT}$ 822 and the power capability processing algorithm power $P_{pack\_shrt\_PCP}$ 820, including changing between prediction strategies when predicted values according to $P_{pack\_long\_PLT}$ 822 become greater than predicted values according to $P_{pack\_shrt\_PCP}$ 820, and vice versa. The operation minimum voltage signal 828 may change states from active to inactive at a time $t_m$ 834. In some instances, the state change of the operation minimum voltage signal 828 from active to inactive may correspond to cell/pack discharge voltage being less than a threshold minimum cell/pack voltage $V_{min}$. An elapsed time 836 between the times $t_{OMVL}$ 832 and $t_m$ 834 may be greater than the elapsed time 817 of FIG. 8A.

The predicted available battery power $P_{predicted}$ may be reduced from the first predicted power 818a at the time $t_{OMVL}$ 832 to the second predicted power 818b at the time $t_m$ 834. Since the elapsed time 836 is greater than the elapsed time 817, the predicted power rate of change dP/dt in FIG. 8B, e.g., determined based on a slope of the line 842, may be less than the predicted power rate of changed dP/dt in FIG. 8A. In some instances, battery controller 50 may use a smaller one of the power predictions from PLT and PCP during normal operation, such as during operation without consecutive occurrences of nonlinear voltage rate of change.

Additionally or alternatively, responsive to detecting a condition for possible nonlinear voltage drop, e.g., at the time $t_{OMVL}$ 832, the battery controller 50 may determine a new minimum discharge power $P_{new}$ that the traction battery 24 may provide based on a predefined operation minimum voltage limit (OMVL). In one example, battery 24 voltage $V_{pack}$ based on the operation minimum voltage limit may be such that $V_{pack\_OMVL}=\Sigma V_{cell\_OMVL}$ for n cells in series inside the traction battery. The new minimum discharge power $P_{new}$ may be less than the corresponding predicted power values determined according to either of the PLT and the PCP algorithm, i.e., $P_{new}<P_{pack\_shrt\_PCP}$ and $P_{pack\_long\_PLT}$. Since the battery controller 50 sets the predicted available battery power $P_{predicted}$ to a smallest one of the predicted powers, e.g., selecting a smallest predicted power among the prediction strategies of $P_{pack\_long\_PLT}$, $P_{pack\_long\_PLT}$, and $P_{new}$, the battery controller 50 may set the predicted available battery power $P_{predicted}$ according to the new minimum discharge power $P_{new}$ strategy when $P_{new}$ strategy returns the smallest predicted power, i.e., $P_{new}<P_{pack\_shrt\_PCP}<P_{pack\_long\_PLT}$.

The battery controller 50 may begin reducing the predicted available power $P_{predicted}$ according to the $P_{new}$ in response to detecting that the operation minimum voltage limit signal 828 is active, e.g., at time $t_{OMVL}$ 832 of the graph 800-B. Since the new algorithm detects the potential nonlinear voltage drop earlier, e.g., at the time $t_{OMVL}$ 832, than the power limiting, e.g., at the time $t_r$ 814, forecasted by the currently used PCP/PLT algorithms, the power reduction rate with the new algorithm may be less than the rate of reduction occurring under PCP or PLT algorithm. FIGS. 8A-8B illustrate values of cell/pack voltage 810 with respect to a predefined minimum cell/pack voltage with the PCP and PLT power predictions for one of the cases where a nonlinear voltage rate of change occurred for two consecutive measurements. If the battery controller 50 applies power reduction measures as soon as it detects the nonlinear voltage rate of change, e.g., at the time $t_{OMVL}$ 832, the rate of power reduction may be less than the rate of power reduction determined using the PCP algorithm. Thus, using the proposed new algorithm, may enable the battery controller 50 to improve power management during sustained discharge operation.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising;
   an engine and electric machine each configured to propel the vehicle; and
   a controller configured to, responsive to a resistance of a traction battery and a change in the resistance during battery discharge being greater than respective thresholds, reduce power to the electric machine and activate the engine.

2. The system of claim 1, wherein the resistance and the change in the resistance are greater than the respective thresholds for at least a predetermined period of time.

3. The system of claim 1, wherein the resistance and the change in the resistance are based on measured discharge current and measured discharge voltage.

4. The system of claim 3, wherein the change in the resistance is based on a decrease in the measured discharge voltage.

5. The system of claim 1, wherein the resistance is based on one of measured battery voltage and measured battery current, and the change in the resistance is based on one of change in the measured battery voltage and change in the measured battery current.

6. The system of claim 1, wherein the controller is further configured to reduce the power to a predefined value.

7. A method for a vehicle, comprising:
   by a vehicle controller, reducing power to an electric machine from a traction battery and activating an engine responsive to resistance of the traction battery and change in the resistance during battery discharge being greater than respective thresholds, wherein each of the electric machine and engine is configured to propel the vehicle.

8. The method of claim 7, wherein the resistance and the change in the resistance are greater than the respective thresholds for at least a predetermined period of time.

9. The method of claim 7, wherein the resistance and the change in the resistance are based on measured discharge current and measured discharge voltage.

10. The method of claim 9, Wherein the change in the resistance is based on a decrease in the measured discharge voltage.

11. The method of claim 7, wherein the resistance is based on one of measured battery voltage and measure battery current, and the change in the resistance is based on one of change in the measured battery voltage and change in measured current.

12. The method of claim 7, wherein the power is reduced to a predefined value.

13. A system for a vehicle, comprising:
    an engine and an electric machine each configured to propel the vehicle; and
    a controller configured to, responsive to a magnitude of battery discharge current being greater than a current threshold and a rate of reduction in battery discharge voltage being greater than a rate of change threshold, reduce battery power being provided to the electric machine and activate the engine.

14. The system of claim 13, wherein the magnitude is greater than the current threshold and the rate is greater than the rate of change threshold for at least a predetermined period of time.

15. The system of claim 13, wherein the controller is further configured to reduce the power to a predefined value.

* * * * *